United States Patent [19]

Kelch

[11] Patent Number: 4,724,186
[45] Date of Patent: Feb. 9, 1988

[54] WEATHERABLE THREE LAYER FILMS

[75] Inventor: Robert H. Kelch, Granville, Ohio

[73] Assignee: The Dow Chemical Company, Midland, Mich.

[21] Appl. No.: 12,589

[22] Filed: Feb. 9, 1987

Related U.S. Application Data

[63] Continuation-in-part of Ser. No. 732,981, May 13, 1985, Pat. No. 4,680,234.

[51] Int. Cl.$^4$ .......................... B32B 15/00; C09J 7/02
[52] U.S. Cl. ..................................... 428/344; 428/447;
428/353; 428/463; 428/518; 428/520; 428/461;
428/514; 156/499
[58] Field of Search ............... 428/394, 463, 518, 520, 428/353

[56] References Cited

U.S. PATENT DOCUMENTS 3,006,889 10/1961 Frey .
3,165,560  1/1965 Frey et al. .
3,291,863 12/1966 Frey et al. .
3,299,182  1/1967 Jennings et al. .
3,705,067 12/1972 Ammons ........................... 428/267
3,819,554  6/1974 Blanchard .
3,845,166 10/1974 Betts et al. .
3,904,579  9/1975 Braddicks .
3,940,456  2/1976 Frey et al. .
3,994,995 11/1976 Frey et al. .
4,029,850  6/1977 Ishii et al. ........................... 428/518
4,113,805  9/1978 Frey et al. .
4,605,592  8/1986 Paquette et al. ................ 428/518 X

FOREIGN PATENT DOCUMENTS 0164151 12/1980 Japan ................................... 428/344

Primary Examiner—P. C. Ives
Attorney, Agent, or Firm—Douglas N. Deline

[57] ABSTRACT

A flexible weather resistant film particularly adapted for use as a weatherable surface coating by lamination to a substrate comprising a weather resistant layer of a blend of a vinyl chloride polymer, an interpolymer of ethylene and at least one carboxylic acid or ester thereof containing ethylenic unsaturation, and chlorinated polyethylene, an adhesive layer for adhesion of the film to a substrate comprising an interpolymer of ethylene and acrylic or methacrylic acid and interposed between the weatherable layer and the adhesive layer, an interlayer comprising a copolymer of ethylene and vinyl acetate.

8 Claims, 1 Drawing Figure

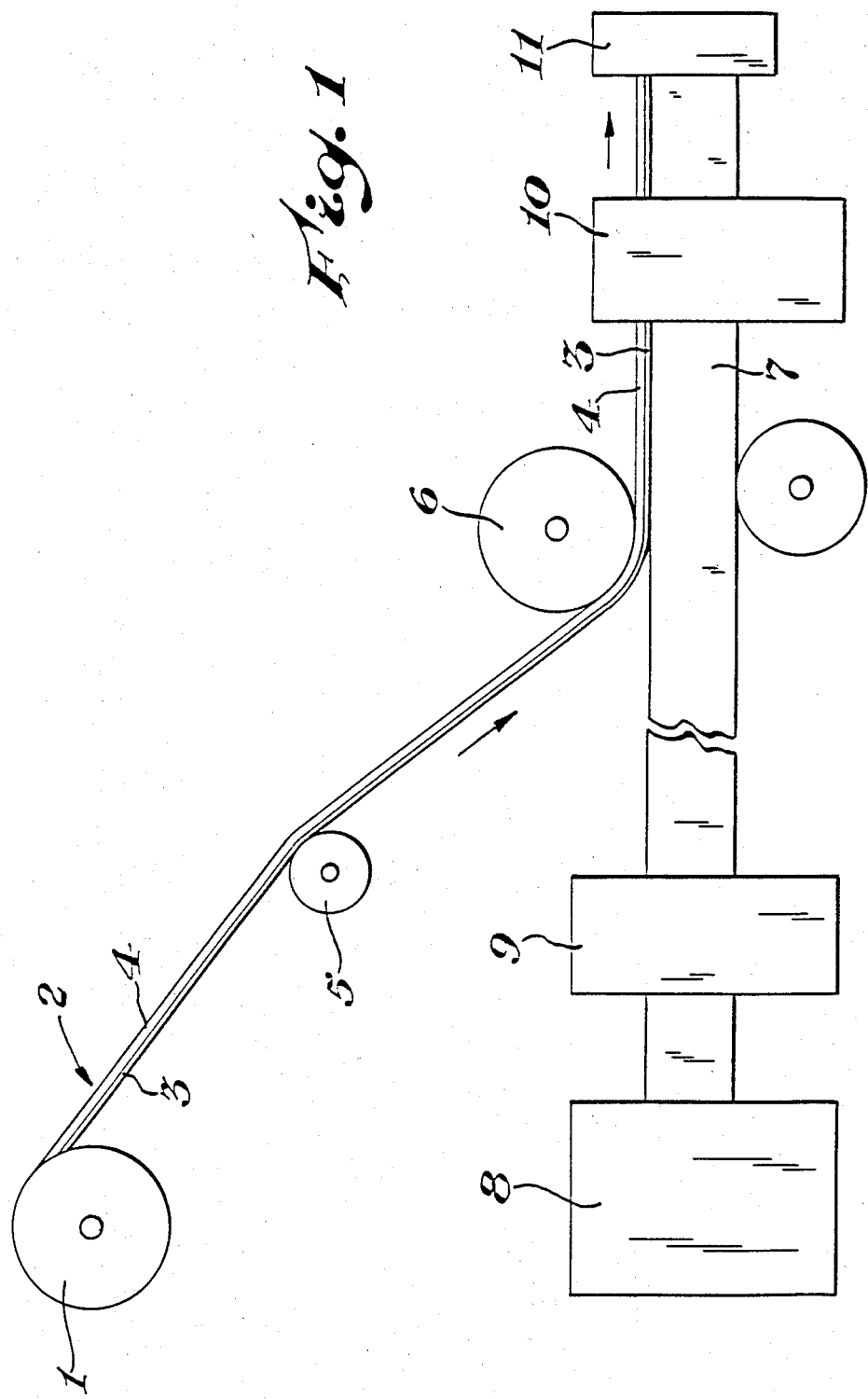

WEATHERABLE THREE LAYER FILMS

CROSS-REFERENCE TO RELATED APPLICATION

This is a continuation-in-part of copending application Ser. No. 732,981, filed May 13, 1985, now U.S. Pat. No. 4,680,234, all of the teachings of which are incorporated by reference thereto.

DESCRIPTION OF THE DRAWING

FIG. 1 depicts an apparatus that is particularly well suited for lamination of films according to the present invention.

BACKGROUND OF THE INVENTION

The present invention relates to weatherable films. More particularly, the present invention relates to such films comprising as one layer thereof a blend of polymers having exceptional stability to ultraviolet light degradation. The novel compositions of the invention are especially well suited for use as extruded films. Such extruded films may be employed as weatherable surface coatings to numerous substrates, especially steel in the form of sheets or other shapes for use in building panels or other architectural applications.

Accordingly, in one embodiment of the present invention, there is provided a film structure comprising an adhesive layer, an interlayer and a weatherable layer wherein the weatherable layer comprises the above polymer blend. In another embodiment of the invention, there is provided a unique laminated structure comprising a substrate having laminated thereto the above described weatherable film.

It is previously known in the art to employ chlorinated polyolefins in applications requiring weatherable surfaces such as in flashing and like architectural type materials. In U.S. Pat. No. 3,705,067, a flashing material comprising one or more film layers of an essentially non-plasticized thermoplastic sheet of solid chlorinated olefin polymer and an inherently porous woven reinforcing fiber mat is disclosed. No adhesive layer is provided. Contact between the fiber layer and the chlorinated olefin layer is obtained by application of heat and pressure. Blends of polyvinyl chloride and chlorinated polyethylene or other chlorinated polyolefins are also previously known. In U.S. Pat. No. 3,165,560, blends of polymers of vinyl chloride including copolymers thereof and chlorinated polyolefins are disclosed having improved impact strength. Foils and thin plates of such blends are further disclosed. Additional teachings of blends of polyvinyl chloride polymers or copolymers and chlorinated polyolefins especially chlorinated polyethylene are found in U.S. Pat. Nos. 3,006,889; 3,291,863; 3,299,182; 3,904,579; 3,940,456; 3,994,995; and 4,113,805. The teachings of all of the above identified patents are herein incorporated by reference.

In U.S. Pat. No. 3,845,166, there is provided a curable composition for wire insulation containing a chlorinated polyolefin, polyvinyl chloride, an ethylene polymer such as ethylene vinyl acetate and a curing agent.

While previously known blends have been usefully employed to prepare moldings and extruded objects, a coextruded film structure having an adhesive layer, an interlayer and a weather resistant layer of such blends is believed to be previously unknown.

It would be desirable to provide a coextruded film which is readily adherable to metal or other structural substrates having improved weathering characteristics. In particular, it would be desirable to provide a thin extruded film having properties suitable for use as a coating to a metal substrate.

SUMMARY OF THE INVENTION

According to the present invention there is now provided a coextruded three layer flexible film particularly adapted for use as a weatherable surface coating by lamination to a substrate, said film having a weatherable layer comprising a blend of a vinyl chloride polymer, an interpolymer comprising ethylene and at least one carboxylic acid or ester thereof containing ethylenic unsaturation and a chlorinated polyolefin, an adhesive layer for adhesion of the film to a substrate comprising an interpolymer of ethylene and acrylic or methacrylic acid and interposed between the weatherable layer and the adhesive layer, an interlayer comprising a copolymer of ethylene and vinyl acetate.

In another embodiment of the present invention, there is provided a structure comprising a substrate, preferably an iron containing substrate such as sheet steel having adhered thereto a coextruded three layer flexible film of the above description.

DETAILED DESCRIPTION OF THE INVENTION

In the present coextruded film composition, the weatherable layer comprising the previously described polymeric blend exhibits long term weather resistance, ultraviolet light stability, hardness, scratch resistance, and an ability to be colored by the use of readily available colorants. Vinyl chloride polymers for use in such layer include polyvinyl chloride as well as polymers of vinyl chloride and at least one comonomer having up to about 10 carbons. Suitable comonomers include olefins, vinyl esters as well as alkyl esters of unsaturated carboxylic acids. Preferred comonomers include vinyl acetate, methyl acrylate or methyl methacrylate. The amount of any such comonomers employed may be up to about 25 percent by weight, preferably no more than about 10 percent by weight. A preferred vinyl chloride polymer is polyvinyl chloride. Additives such as stabilizers, lubricants, etc. may be present if desired. Suitably, the vinyl chloride polymer has an inherent viscosity of from about 0.6 to about 1.0 measured by ASTM Method Number D-1243. A preferred range is from about 0.65 to about 0.8.

Chlorinated polyolefins usefully employed in the blend comprising the weatherable layer include solid particulated polyolefins that have been chlorinated according to known techniques. Preferred chlorinated polyolefins are chlorinated polyethylenes especially such polyethylenes such as low pressure polyethylene having been chlorinated at elevated temperatures above 90° C. Suitable chlorinated polyethylenes and processes for their manufacture are more particularly described in the previously cited references, the teachings of which have already been incorporated herein by reference thereto. The chlorinated polyolefin resin suitably has a melt viscosity of from about 6,000 to about 30,000 poise measured according to Dow published Method CPE D-3a. A preferred viscosity is from about 7,500 to about 25,000. The chlorine content of the chlorinated polyolefin resin is suitably from about 15 to about 42 percent by weight, preferably from about 30 to about 40 percent by weight. Additional additives may also be present in the chlorinated polyolefin if desired. Examples include silinic acid and a siloxane oil as disclosed in U.S. Pat. No. 3,940,456, stabilizers, processing aids, etc.

In the blend, the weight proportions of vinyl chloride polymers to chlorinated polyolefin may vary from about 5:95 to about 80:20. A preferred proportion is from about 10:90 to about 75:25.

As previously stated, there is also provided in addition to the previously described vinyl chloride polymer and chlorinated polyolefin, an interpolymer of ethylene and at least one carboxylic acid or ester thereof containing ethylenical unsaturation. Especially preferred is a copolymer of ethylene and vinyl acetate. In the terblend, the interpolymer of ethylene and at least one carboxylic acid or ester thereof containing ethylenic unsaturation is suitably added to the previously described blend of vinyl chloride polymer and chlorinated polyolefin in an amount up to about 30 percent, preferably up to about 15 percent based on total terblend weight. The interpolymer of ethylene and at least one carboxylic acid ester containing ethylenic unsaturation suitably has a melt index from about 0.8 to about 10 measured under ASTM D-1238 Condition E and preferably from about 1.0 to about 8. The percent ethylene in such interpolymer is suitably from about 90 to about 35 percent, preferably from about 80 to about 40 percent, based on total interpolymer weight.

Additional components may also be present in the weatherable composition according to the present invention. Most notably, however, plasticizing additives such as mineral oil, etc. need not be present or their amounts may be greatly reduced due to the plasticizing effect of the chlorinated polyolefin component. However, suitable additives which may be included are thermal stabilizers, process aids, pigments, colorants, fire retardants, antioxidants, fillers, etc. Suitable thermal stabilizers include metal or mixed metal compounds such as barium, cadmium, zinc, calcium, sodium or lead salts of carboxylic acids especially long chain fatty acids (maleates, stearates, laurates, etc.), phosphorous containing compositions, epoxy resins, and epoxidized vegetable oils, etc. Processing aids include low molecular weight polyethylene wax compositions, oxidized polyethylene wax, ester wax, etc. Such processing aids may be used in combination with a coupling agent according to known techniques if desired. Suitable pigments employed according to the present invention include well-known additives such as titanium dioxide or carbon black. Fillers may be added in place of or in addition to pigments if desired. Suitable compatible fillers include talc, mica, calcium carbonate, clay, aluminum trihydrate, glass micropheres, etc. An ignition inhibiting agent may additionally be employed where desired in order to improve the ignition resistance of the present compositions. Suitable ignition inhibitors include the well-known brominated aromatic compounds as well as phosphorous or antimony containing compounds or mixtures thereof. Antioxidants are suitably of the hindered phenol type such as butylated hydroxy toluene, tetratertiary butyl dihydroxy biphenyl, etc.

Preferably, such additives collectively are added so as to comprise no more than about 75 percent by weight of the resulting composition. It has been discovered that at least some titanium dioxide, i.e., from about 1.0–25.0 percent by weight, is desired to provide the test ultraviolet light resistance.

Previously known conventional compounding systems may be employed in the preparation of compositions of the invention. Examples of suitable equipment include Banbury mixers, roll mills, continuous mixer-/extruders, twin screw compounding extruders, etc. In the process, the various resins in their respective proportions are added in the form of pellets, or other suitable form along with additional desired additives. The mixture is then thoroughly mixed by use of one of the aforementioned compounding systems until a homogeneous melt is obtained. The melt may then be coextruded with the remaining polymers to form the coextruded film laminate comprising one embodiment of the present invention. Suitable equipment for the mixing and coextruding operations includes equipment for use with chlorine containing polymers which are well designed to prevent polymer degradation. The presence in the weatherable blend of an interpolymer of ethylene and at least one carboxylic acid ester containing ethylenic unsaturation contributes to improved compatibility between the weatherable layer and the adjacent interlayer.

The interlayer comprising a copolymer of ethylene and vinyl acetate greatly improves the resulting performance of the invented structure, providing adhesive improvements as much as 500 to 1000 percent or more compared to films lacking in such interlayer. Suitable copolymers are those having vinyl acetate contents from 10 to 60 and melt flow rates from about 0.5 to about 10.

The interlayer of the present invention is preferably coextensive with the weatherable layer and adhesive layer and tightly bonded to both remaining layers as a result of the well-known coextrusion process. By the term "tightly bonded" is meant that the adhesion obtained between adjacent layers is at least as great as that of either layers own internal cohesive strength.

Suitable interpolymers of ethylene and acrylic acid or methacrylic acid for use in the adhesive layer include from about one to about 30 percent by weight, preferably about 5 to about 25 percent by weight of acrylic acid or methacrylic acid. Although not preferred, such interpolymers may additionally include, in polymerized form, an ethylenically unsaturated carboxylic acid ester, such as t-butyl acrylate, vinyl acetate, etc. In a preferred embodiment, the interpolymer is essentially random and homogeneous. Preferred interpolymers for use herein are available under the tradename EAA, or PRIMACOR ® from The Dow Chemical Company.

Antioxidants, such as the hindered phenolics, thermal stabilizers, UV stabilizers, anti-blocking aids, and other known additives may also be incorporated into either the interlayer or the adhesive layer, as is well known in the art. In addition, melt viscosities of the various resin blends may be appropriately adjusted in order to provide uniformity in extrusion layer distribution in the resulting coextruded film. In the practice of the invention interlayer adhesive strengths of at least about 8 lbs./inch width may suitably be attained, while adhesive strengths to substrate surfaces in the resulting laminated structures may vary from about 10 to about 30 lbs./inch width.

Suitably, the layers of a film prepared according to the present process are from about 0.01 mm to about 1 mm in thickness. Generally, the weather resistant first layer is thicker than the remaining two layers. Suitably, such first layer is about 2 to about 5 times thicker than either the interlayer or the adhesive layer. By means of the coextruded adhesive layer, the film structure of the invention may be applied to substrates without the use of conventional adhesives. The film is easily bonded to a hot metal surface employing presently available lamination equipment. A suitable lamination apparatus is more particularly described by reference to the figure.

In the apparatus, there is provided a film roll unwind 1 for supply of the laminated weatherable film 2 having combined interlayer and adhesive layer 3 and weatherable layer 4. The laminated weatherable film 2 is passed over a tensioning roller 5 and under a lamination nip roll 6 where it is contacted with a heated substrate 7 obtained from substrate supply 8. Heating of the substrate may be occasioned by use of heating means 9 which may be an oven, induction heater, hot rollers or other heating means. After lamination to the substrate, the resulting laminate may be quenched either with or without an additional heating stage to obtain thorough adhesion in the post treatment stage 10, and recovered by coiling or other means in the recovery stage 11.

In the use of the present invention, the coextruded flexible film may be employed as a coating over a variety of suitable substrates. Included are metals such as aluminum, steel, galvanized steel, stainless steel, weatherable alloys such as GALVALUME®, and other suitable substrates such as plastics, fabrics, and cellulosic materials such as paper. In the preferred embodiment, the substrate is a metal, especially galvanized steel.

The substrates having the presently described coextruded flexible film adhered thereto may be used in a variety of applications including roof sheeting, corrugated roofing, standing seam roofing, building panels, siding, gutters, downspouts, facia and other architectural trim, storage vessels, containers, tanks, highway barriers, window and door frames, culverts, piping, pipe jacketing, equipment housing for air conditions, ventilators, pumps, and the like, and parts such as body panels, housings, etc. in vehicles including automobiles, trucks, etc.

Because the composition of the present invention may contain colorants and pigments or separate layers of the coextruded flexible film may contain such additives no additional topcoating is necessary or required in the resulting structures. However, a coating of paint or other material may be applied if desired.

SPECIFIC EMBODIMENTS

Having described the invention, the following examples are provided to more particularly describe the present invention but not to be construed as limiting.

EXAMPLE 1

A weather resistant blend of copolymers demonstrating good adhesive compatibility and weather resistance is prepared by combining the following ingredients in the indicated weight percentage based on total composition weight.

| Component | Amount (%) |
| --- | --- |
| polyvinyl chloride resin (GEON ® 86, available from B. F. Goodrich, Inc.) | 44.68 |
| chlorinated polyethylene (CPE 3611 available from The Dow Chemical Company) | 18.62 |
| ethylene vinylacetate copolymer (EVA 3190 available from E. I. DuPont deNemours) | 11.17 |
| TiO₂ (DuPont R-960) | 14.89 |
| CaCO₃ (CS-11 available from Georgia Marble, Inc.) | 3.72 |
| Calcium Stearate | 0.60 |
| Polyethylene wax (6A available from Allied Chemical) | 0.74 |
| Plaschek 775 ESO (available from Ferro Corp.) | 2.23 |
| THERMCHEK ® 1827 | 2.23 |
| THERMCHEK ® 904 | 0.74 |
| IRGANOX ® 1076 (available from Ciba-Geigy, Inc.) | 0.38 |

The terblend is prepared by first charging the polyvinyl chloride resin to a Henschel high intensity mixer and mixing for one minute. The processing aids and thermal stabilizers (but not pigments or additional resins) are added and mixing is continued for several minutes until a temperature of about 80°–95° C. is obtained. The material is removed from the mixer and added to a Banbury mixer along with the additional components. The blend is fluxed for about five minutes until the temperature reaches about 160°–180° C. and transferred to a two roll mill, formed into sheets, cooled and cut into cubes.

The resulting material may be reheated and coextruded in an 80/10/10 weight ratio with an interlayer resin and an adhesive resin to form a three layer film. The interlayer comprises ethylene/vinylacetate copolymer (ELVAX 3190, available from E. I. DuPont de Nemours and Co.). The adhesive layer comprises a random, homogeneous copolymer of ethylene and acrylic acid containing 9 percent acrylic acid, PRIMACOR ®1410, available from The Dow Chemical Company. The coextruded film, 0.13 mm in thickness, is chilled and wound into a coil.

After edge trimming and slitting to width, the coextruded film is adhered to a thin steel sheet by a hot metal coating apparatus substantially according to the design illustrated in FIG. 1. The metal is heated to a temperature of about 200° C. and contacted with the adhesive from by means of the nip roller. The composite structure is then cooled by a water quench and coiled.

The composite metal/film structure may be easily formed by cold rolling, stamping or other suitable process. Double sided lamination may be achieved by simultaneously or sequentially coating both surfaces of the substrate with the coextruded flexible film.

What is claimed is:

1. A coextruded three ayer flexible film particularly adapted for use as a weatherable surface coating by lamination to a substrate having a weatherable layer comprising a blend of a vinyl chloride polymer, an interpolymer comprising ethylene and at least one carboxylic acid or ester thereof containing ethylenic unsaturation and a chlorinated polyolefin, an adhesive layer for adhesion of the film to a substrate comprising an interpolymer of ethylene and acrylic or methacrylic acid and interposed between the weatherable layer and the adhesive layer an interlayer comprising a copolymer of ethylene and vinyl acetate.

2. A film according to claim 1, wherein the vinyl chloride polymer is selected from the group consisting of polyvinyl chloride and polymers of vinyl chloride and at least one comonomer having up to about 10 carbons selected from the group consisting of olefins, vinyl esters and alkyl esters of unsaturated carboxylic acids.

3. A film according to claim 2, wherein the vinyl chloride polymer has an inherent viscosity of from about 0.6 to about 1.0.

4. A film according to claim 1, wherein the chlorinated polyolefin is chlorinated polyethylene.

5. A film according to claim 4, wherein the chlorinated polyethylene resin has a viscosity of from about 6,000 to about 30,000 poise.

6. A film according to claim 1, wherein the interpolymer of ethylene and at least one carboxylic acid or ester thereof containing ethylenic unsaturation is an ethylene/vinyl acetate copolymer.

7. A laminated structure comprising a substrate having adhered thereto a coextruded flexible film according to claim 1.

8. A laminated structure according to claim 7, wherein the substrate comprises galvanized steel.

* * * * *

UNITED STATES PATENT AND TRADEMARK OFFICE
CERTIFICATE OF CORRECTION

PATENT NO. : 4,724,186

DATED : February 9, 1988

INVENTOR(S) : Robert H. Kelch

It is certified that error appears in the above-identified patent and that said Letters Patent is hereby corrected as shown below:

Col. 2, line 65, "15" should read --25--.

Col. 3, line 52, "micropheres" should read --microspheres--.

Col. 3, line 65, "test" should read --best--.

Col. 6, line 42, "from" should read --film--.

Col. 6, line 50, "ayer" should read --layer--.

Signed and Sealed this

First Day of November, 1988

Attest:

DONALD J. QUIGG

Attesting Officer

Commissioner of Patents and Trademarks